(12) United States Patent
Jung et al.

(10) Patent No.: US 8,045,079 B2
(45) Date of Patent: Oct. 25, 2011

(54) DISPLAY DEVICE

(75) Inventors: Kwang-Chul Jung, Seongnam-si (KR);
Mee-Hye Jung, Suwon-si (KR);
Joon-Chul Goh, Seoul (KR);
Chong-Chul Chai, Seoul (KR)

(73) Assignee: Samsung Electronics Co., Ltd. (KR)

( * ) Notice: Subject to any disclaimer, the term of this patent is extended or adjusted under 35 U.S.C. 154(b) by 234 days.

(21) Appl. No.: 12/198,435

(22) Filed: Aug. 26, 2008

(65) Prior Publication Data

US 2009/0135358 A1    May 28, 2009

(30) Foreign Application Priority Data

Nov. 27, 2007  (KR) .................. 10-2007-0121305

(51) Int. Cl.
*G02F 1/1339*  (2006.01)
(52) U.S. Cl. ...................... 349/43; 349/48; 349/129
(58) Field of Classification Search .............. 349/43, 349/48, 129
See application file for complete search history.

(56) References Cited

U.S. PATENT DOCUMENTS

| | | | | |
|---|---|---|---|---|
| 5,656,824 | A | * | 8/1997 | den Boer et al. ............ 257/59 |
| 7,649,601 | B2 | * | 1/2010 | Ikeda et al. .................. 349/129 |
| 7,652,725 | B2 | * | 1/2010 | Lee et al. ...................... 349/38 |

FOREIGN PATENT DOCUMENTS

| | | |
|---|---|---|
| JP | 2007011056 | 1/2007 |
| KR | 1020040062195 | 7/2004 |
| KR | 1020060094688 | 8/2006 |
| KR | 1020070054809 | 5/2007 |

* cited by examiner

*Primary Examiner* — Phu Vu
(74) *Attorney, Agent, or Firm* — Cantor Colburn LLP

(57) ABSTRACT

A display device which includes a substrate, a gate line formed on the substrate, a data line intersecting the gate line, and a thin film transistor having a gate electrode connected to the gate line, a source electrode which overlaps the gate electrode and is connected to the data line, and a drain electrode which overlaps the gate electrode. The overlapping area between the gate electrode and the drain electrode is larger than the overlapping area between the gate electrode and the source electrode.

18 Claims, 6 Drawing Sheets

DISPLAY DEVICE

This application claims priority to Korean Patent Application No. 10-2007-0121305 filed on Nov. 27, 2007, and all the benefits accruing under 35 U.S.C. §119, the contents of which in its entirety are herein incorporated by reference.

BACKGROUND OF THE INVENTION

1. Field of the Invention

The present invention relates to a liquid crystal display device.

2. Description of the Related Art

Liquid crystal displays ("LCDs") are one of the most widely used flat panel displays. An LCD includes a pair of panels having field-generating electrodes, such as pixel electrodes and a common electrode, and a liquid crystal ("LC") layer interposed between the two panels. The LCD displays images by applying voltages to the field-generating electrodes to generate an electric field in the LC layer which determines the orientations of LC molecules therein to adjust polarization of incident light.

The LCD also includes switching elements respectively connected to the pixel electrodes, and a plurality of signal lines such as gate lines and data lines to apply voltages to the pixel electrodes by controlling the switching elements.

The LCD is widely used as a display screen for televisions as well as for display devices for computers, such that the demand for LCDs with the capacity to display motion pictures is increasing. Various methods for improving a motion picture display characteristic, and high speed driving are being developed.

BRIEF SUMMARY OF THE INVENTION

The present invention has been made in an effort to solve the above-stated problem, and aspects of the present invention provide a display device which secures a sufficient charging time of the pixels by reducing the delay of the data voltages of the liquid crystal display.

According to an exemplary embodiment, the present invention provides a display device which includes a substrate, a gate line formed on the substrate, a data line intersecting the gate line, and a thin film transistor having a gate electrode connected to the gate line, a source electrode which overlaps the gate electrode and is connected to the data line, and a drain electrode which overlaps the gate electrode, wherein an overlapping area between the gate electrode and the drain electrode is larger than an overlapping area between the gate electrode and the source electrode.

According to an exemplary embodiment, the source electrode extends in a first direction and includes a bar shape.

According to an exemplary embodiment, the drain electrode encloses the source electrode.

According to an exemplary embodiment, the drain electrode includes a first portion which overlaps the gate electrode and extends in the first direction, and a second portion which overlaps the gate electrode, is connected to the first portion, and extends in a second direction perpendicular to the first direction.

According to an exemplary embodiment, the drain electrode further includes a third portion which overlaps the gate electrode, is connected to the first portion, and is parallel to the second portion.

According to an exemplary embodiment, the drain electrode includes a portion which is curved toward the source electrode and includes a "U" shape.

According to an exemplary embodiment, the overlapping area between the gate electrode and the drain electrode is three times the overlapping area between the gate electrode and the source electrode.

According to an exemplary embodiment, the display device further includes a pixel electrode connected to the drain electrode, a common electrode facing the pixel electrode, and a liquid crystal layer formed between the pixel electrode and the common electrode.

According to an exemplary embodiment, the pixel electrode includes a plurality of cutouts which form an oblique angle with the gate line.

According to an exemplary embodiment, the cutouts are symmetrical with a straight line bisecting the pixel electrode and parallel to the gate line.

According to an exemplary embodiment, the thin film transistor includes a first thin film transistor and a second thin film transistor, and the display device further includes a first sub-pixel electrode connected to the drain electrode of the first thin film transistor and a second sub-pixel electrode connected to the drain electrode of the second thin film transistor.

According to an exemplary embodiment, the source electrodes of the first and second thin film transistors are connected to a same data line.

A voltage of the first sub-pixel electrode is higher than a voltage of the second sub-pixel electrode with reference to a predetermined voltage.

According to another exemplary embodiment, the present invention provides a display device which includes a substrate, a gate line formed on the substrate, a data line intersecting the gate line, and a thin film transistor including a gate electrode, a source electrode, and a drain electrode.

According to an exemplary embodiment, the gate electrode is connected to the gate line, the source electrode is connected to the data line and includes a first edge and a second edge which overlaps the gate electrode and are parallel to each other and a third edge connecting the first and second edges to each other, and the drain electrode includes a facing portion which overlaps the gate electrode at least facing the first and third edges of the source electrode, and a connecting portion connected to the facing portion.

According to an exemplary embodiment, the drain electrode faces the second edge of the source electrode.

According to an exemplary embodiment, the facing portion is curved toward the source electrode and includes a "U" shape.

According to an exemplary embodiment, a delay of the data voltage of the liquid crystal display is prevented, thereby obtaining enough charging time for the pixel under high speed driving.

BRIEF DESCRIPTION OF THE DRAWINGS

The above and/or other aspects, features, and advantages of the present invention will become more apparent from the following detailed description when taken in conjunction with the accompanying drawings, in which.

DETAILED DESCRIPTION OF THE INVENTION

Figure 1:
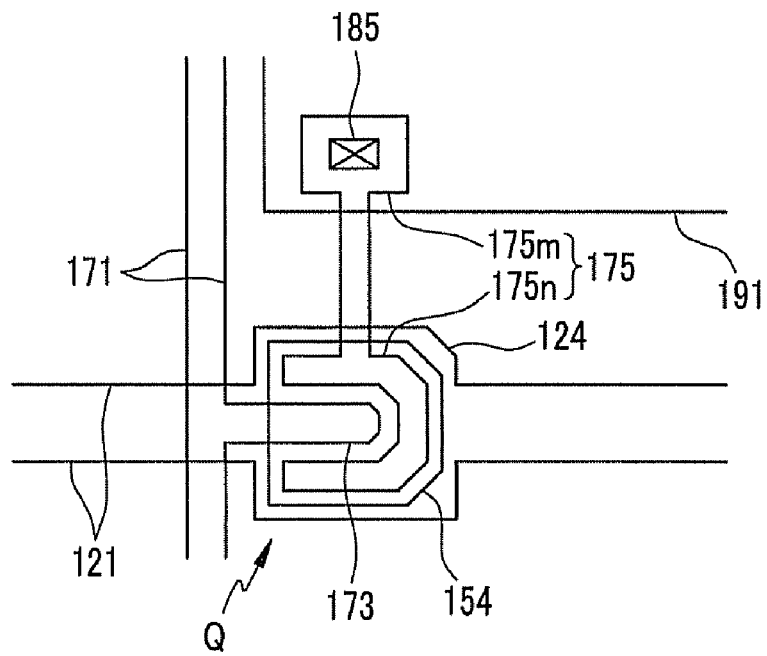
FIG. 1 is a layout view of an exemplary embodiment of a portion of a thin film transistor array panel according to the present invention.

The invention is described more fully hereinafter with reference to the accompanying drawings, in which exemplary embodiments of the invention are shown. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Now, a thin film transistor array panel according to an exemplary embodiment of the present invention will be described in detail with reference to FIG. 1.

FIG. 1 is a layout view of an exemplary embodiment of a portion of a thin film transistor array panel according to the present invention.

Referring to FIG. 1, a thin film transistor array panel includes a pixel electrode 191, a thin film transistor Q, a gate line 121, and a data line 171.

The gate line 121 transmits gate signals and extends in a transverse direction. The data line 171 transmits data voltages, is insulated from the gate line 121, and extends in a vertical direction and crossing the gate line 121.

The thin film transistor includes a gate electrode 124, a source electrode 173, a drain electrode 175, and a semiconductor member 154.

As shown in FIG. 1, the gate electrode 124 extends from the gate line 121 in upward and downward directions as a portion of the gate line 121, and is insulated from the semiconductor member 154, the source electrode 173, and the drain electrode 175.

According to an exemplary embodiment, the semiconductor member 154 overlaps the gate electrode 124.

The source electrode 173 is disposed on the semiconductor member 154, and extends toward the gate electrode 124 from the data line 171 and overlaps the gate electrode 124 and is a portion of the data line 171. The source electrode 173 includes a bar shape, and a length direction thereof is parallel to the gate line 121.

The drain electrode 175 includes a facing portion 175n enclosing a portion of the source electrode 173, and a connection portion 175m which is connected to the facing portion and includes a bar shape.

The facing portion 175n overlaps the gate electrode 124, and faces three edges of the source electrode 173 and encloses the edges. Further, the facing portion 175n includes a first portion extended parallel to the gate line 121, a second portion extended parallel to the data line 171, and a third portion parallel to the first portion. The second portion is disposed between the first portion and the third portion, and is perpendicular to the first portion and the third portion. The first, second and third portions are connected to each other, and the facing portion 175n forms a "U" shape. Alternatively, according to another exemplary embodiment, the first, second and third portions may be directly connected to each other.

An overlapping area of the facing portion 175n of the drain electrode 175 and the gate electrode 124 is larger than an overlapping area of the source electrode 173 and the gate electrode 124, and may be approximately three times the size.

According to another exemplary embodiment, ohmic contacts (not shown) may be formed between the semiconductor member 154 and the source electrode 173 and drain electrode 175 to reduce the contact resistance therebetween.

The pixel electrode 191 is connected to the drain electrode 175 of the thin film transistor Q, and receives data voltages from the drain electrode 175. In the current exemplary embodiment, the pixel electrode 191 is insulated from the thin film transistor Q via an insulating layer, and the pixel electrode 191 is connected to the drain electrode 175 through a contact hole 185 formed in the insulating layer. The gate signal includes a gate-on voltage and a gate-off voltage, and if the gate-on voltage is applied to the gate electrode 124 through the gate line 121, the thin film transistor Q is turned on. Further, the data voltages applied to the source electrode 173 through the data line 171 are transmitted to the drain electrode 175. The data voltages applied to the drain electrode 175 are transmitted to the pixel electrode 191, thereby being displayed as pixel electrode voltages.

The data voltages which flow according to the data line 171 may be delayed due to parasitic capacitance generated between the source electrode 173 and the gate electrode 124. Further, since the data voltages are applied with a high frequency in the case of high speed driving, the charging in which that the data voltages are charged to the pixel electrode 191 may be not sufficient. Accordingly, it is important to reduce the parasitic capacitance generated between the source electrode 173 and the gate electrode 124.

The parasitic capacitance generated between the source electrode 173 and the gate electrode 124 depends on the overlapping area of the source electrode 173 and the gate electrode 124. Accordingly, the overlapping area between the source electrode 173 and the gate electrode 124 needs to be decreased to reduce the parasitic capacitance, but the width of the channel of the thin film transistor is then decreased such that the characteristic of the thin film transistor may be deteriorated. In the current exemplary embodiment, the overlapping area between the drain electrode 175 and the gate electrode 124 is increased in substitution for the reduction of the overlapping area between the source electrode 173 and the gate electrode 124 such that a sufficient width of the channel is secured and the parasitic capacitance generated between the source electrode 173 and the gate electrode 124 may be reduced. As the overlapping area is reduced, the delay of the data voltages is reduced to thereby secure sufficient charging time for the pixel.

According to another exemplary embodiment, the connection portion 175m of the drain electrode 175 may be connected to another portion instead of to the pixel electrode 191. For example, the connection portion 175m may be connected to a thin film transistor in an organic light emitting device.

Now, a thin film transistor array panel according to another exemplary embodiment of the present invention will now be described in detail with reference to FIG. 2.

Figure 2:
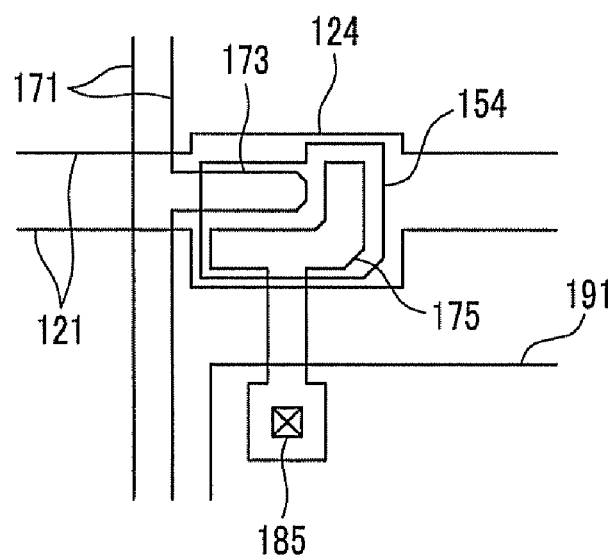
FIG. 2 is a layout view of another exemplary embodiment of a portion of a thin film transistor array panel according to the present invention.

FIG. 2 is a layout view of a thin film transistor array panel according to another exemplary embodiment of the present invention.

Referring to FIG. 2, a thin film transistor array panel according to the present exemplary embodiment also include a gate line 121 including a gate electrode 124, a semiconductor member 154 disposed on the gate electrode 124, and a data line 171 including a source electrode 173, a drain electrode 175, and a pixel electrode 191.

Also, the overlapping area between the gate electrode 124 and the source electrode 173 is less than the overlapping area between the gate electrode 124 and the drain electrode 175.

However, the drain electrode 175 only encloses a portion of the source electrode 173 having a bar shape in the thin film transistor array panel of FIG. 2, different from the thin film transistor array panel of FIG. 1. That is to say, the drain electrode 175 includes a first portion parallel to the data line 171, and a second portion parallel to the gate line 121. Thus, the width of the channel is decreased, and since the overlapping area between the gate electrode 124 and the drain electrode 175 is reduced compared with the thin film transistor array panel of FIG. 1, the parasitic capacitance between the gate electrode 124 and the drain electrode 175 maybe reduced. Also, the overlapping area between the gate electrode 124 and the source electrode 173 is small such that the parasitic capacitance generated between the gate electrode 124 and the source electrode 173 may be reduced.

Now, a liquid crystal display according to another exemplary embodiment of the present invention will now be described in detail with reference to FIG. 3 through FIG. 5.

Figure 3:
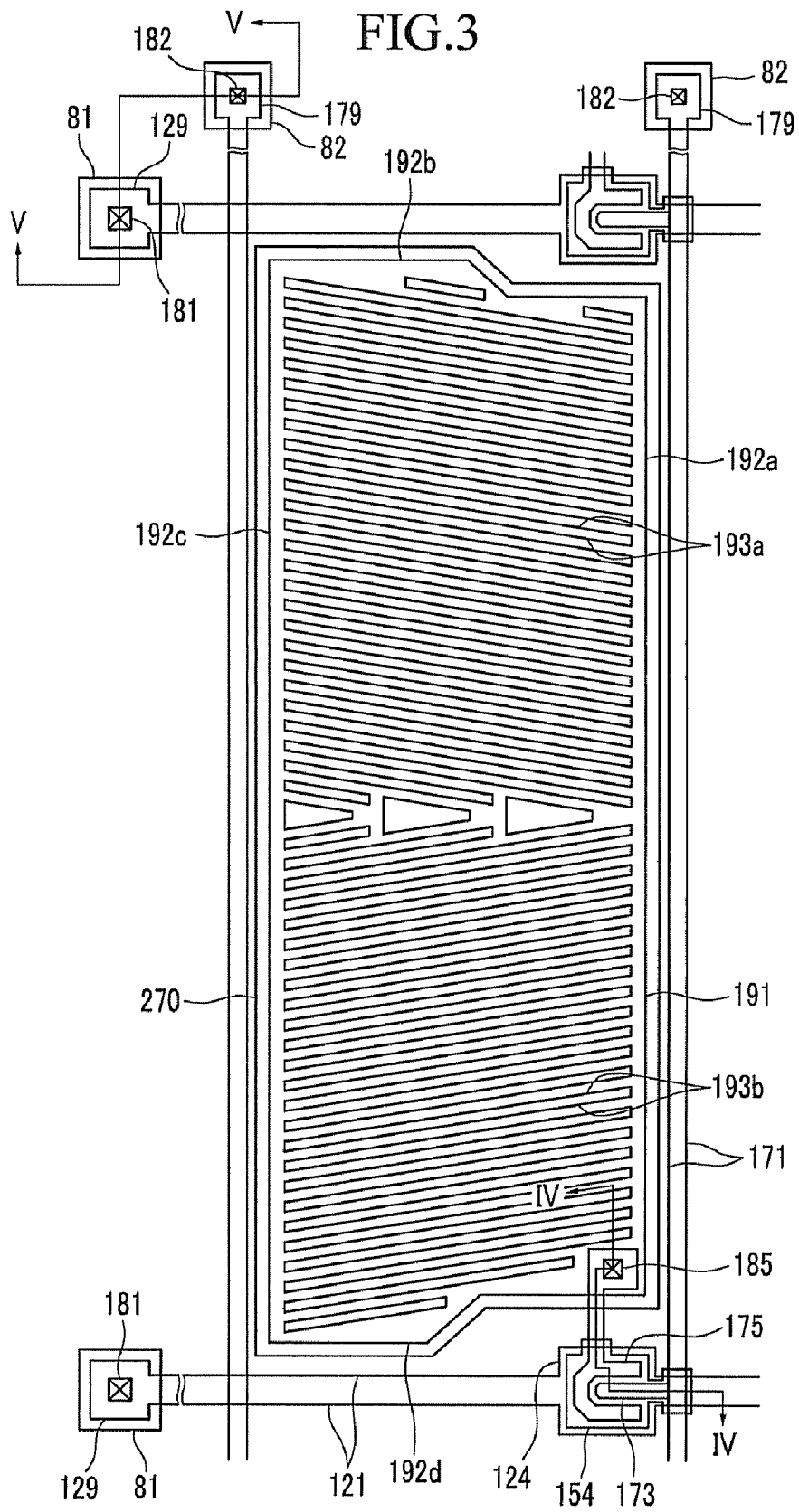
FIG. 3 is a layout view of an exemplary embodiment of a liquid crystal display according to the present invention.
Figure 4:
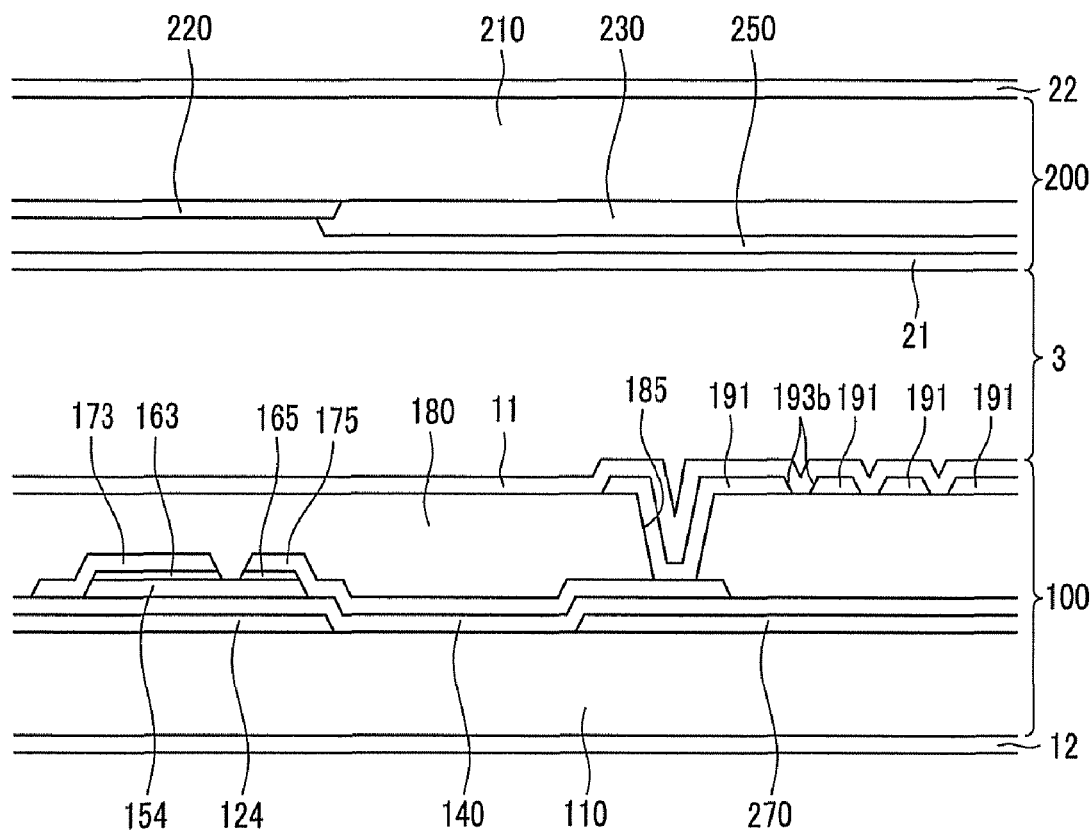
FIG. 4 and FIG. 5 are cross-sectional views of the liquid crystal display shown in FIG. 3 taken along the lines IV-IV and V-V, respectively.
Figure 5:
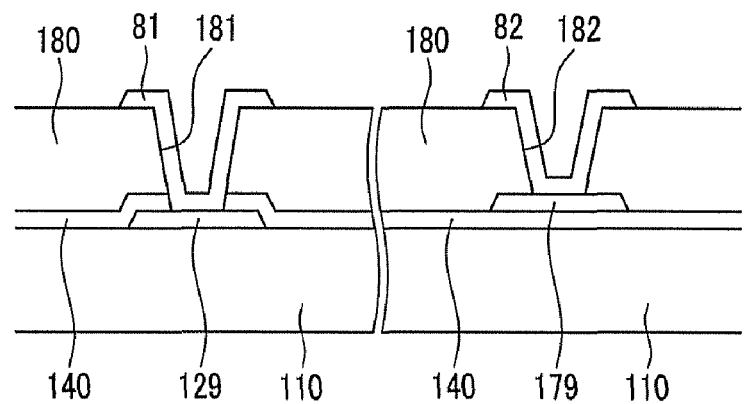

FIG. 3 is a layout view of a liquid crystal display according to an exemplary embodiment of the present invention, and FIG. 4 and FIG. 5 are cross-sectional views of the liquid crystal display shown in FIG. 3 taken along the lines IV-IV and V-V, respectively.

A liquid crystal display includes a lower panel 100 and an upper panel 200 facing to each other, a liquid crystal layer 3 formed between the lower and upper panels 100 and 200, and a pair of polarizers 12 and 22 respectively attached to surfaces outside the lower and upper panels 100 and 200.

The lower panel 100 includes a common electrode 270 is formed on an insulating substrate 110 made of a material such as transparent glass or plastic, for example. The common electrode 270 is made of a transparent conductive material such as indium tin oxide or indium zinc oxide ("ITO or IZO"), and receives a common voltage Vcom.

A plurality of gate lines 121 are formed on the insulating substrate 110 and the common electrode 270. Each of the gate lines 121 includes a plurality of gate electrodes 124 projecting upward and downward, and an end portion 129 including a large area for contact with another layer or an external driving circuit (not shown).

A gate insulating layer 140 is formed on the gate lines 121, and a plurality of semiconductor members 154 are formed on the gate insulating layer 140.

A plurality of pairs of ohmic contact members 163 and 165 are formed on the semiconductor members 154, and a plurality of data lines 171 and a plurality of drain electrodes 175 are formed on the ohmic contacts 163 and 165 and the gate insulating layer 140.

The data lines 171 transmit data signals and extend in a longitudinal direction to intersect the gate lines 121. Each data line 171 includes a plurality of source electrodes 173 and an end portion 179 including a large area for contact with another layer or an external driving circuit (not shown).

A passivation layer 180 is formed on the data lines 171, the drain electrodes 175, and the exposed semiconductor members 154. According to an exemplary embodiment, the passivation layer 180 is made of an inorganic material such as silicon nitride and silicon oxide, for example.

The passivation layer 180 includes a plurality of contact holes 182 and 185 respectively exposing the end portions 179 of the data lines 171 and the drain electrodes 175, and the passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180. The pixel electrodes 191 may be made of a transparent conductive material such as ITO or IZO.

The pixel electrodes 191 include a pair of transverse edges 192b and 192d parallel to the gate lines 121 and a pair of vertical edges 192a and 192c parallel the data lines 171, forming an approximate quadrangle shape, for example. The pixel electrodes 191 include a plurality of cutouts 193a and 193b formed between the two vertical edges 192a and 192c. The cutouts 193a and 193b are divided into first cutouts 193a and second cutouts 193b that are respectively disposed in the upper and lower sides with respect to an imaginary transverse line intersecting the center of the pixel electrodes 191. The first cutouts 193a form an acute angle with the gate lines 121, and the second cutouts 193b form an obtuse angle the gate lines 121. The first and the second cutouts 193a and 193b are symmetrical with respect to the imaginary transverse line.

The pixel electrodes 191 are physically and electrically connected to the drain electrodes 175 through the contact holes 185, and receive data voltages from the drain electrodes 175.

The pixel electrodes 191 applied with the data voltages and the common electrode 270 applied with the common voltage generate an electric field that determines the orientations of liquid crystal molecules of the liquid crystal layer 3 between two electrodes 191 and 270. The electric field includes all vertical components perpendicular to the surface of the thin film transistor array panel, and horizontal components parallel to the surface of the display panel and perpendicular to the cutouts 193a and 193b.

The horizontal components of the electric field rotate the liquid crystal molecules of the liquid crystal layer 3 that is disposed on the common electrode and pixel electrodes 270 and 191 on the surface in parallel with the thin film transistor array panel. Contrarily, the vertical components of the electric field enable the liquid crystal molecules to be vertically inclined. According to orientations of the liquid crystal molecules that are determined by an electric field, polarization of light passing through a liquid crystal layer 3 changes and light transmittance also changes.

Since long axes of the liquid crystal molecules are dispersed in several directions, a liquid crystal display including the TFT array panel has a wide reference viewing angle. Further, since both a horizontal component and a vertical component of an electric field contribute to display of an image, the aperture ratio and transmittance of the liquid crystal display are very high, and particularly in a transmissive liquid crystal display in which both the common electrode 270 and the pixel electrode 191 including the cutouts 193a and 193b are transparent, the aperture ratio and transmittance of the liquid crystal display are extremely high.

The pixel electrode 191 and the common electrode 270 form a "liquid crystal capacitor" including a liquid crystal layer as a dielectric material and form a "storage capacitor" including the passivation layer 180 as a dielectric material, and sustain an applied voltage even after a TFT is turned off.

The contact assistants 81 and 82 are respectively connected to the end portions 129 and 179 of the gate lines 121 and the data lines 171 through the contact holes 181 and 182. The contact assistants 81 and 82 enhance the adhesion force between the end portions 129 and 179 and external devices, and protect them.

The upper panel 200 includes a light blocking member 220 formed on an insulating substrate 210 which is made of transparent glass or plastic. According to an exemplary embodiment, the light blocking member 220 is a black matrix, and prevents light leakage.

A plurality of color filters 230 are formed on the insulating substrate 210. The color filters 230 are located in a region surrounded by the light blocking member 220, and extend in a vertical direction along a column of the pixel electrodes 191. Each color filter 230 represents one of three primary colors, such as red, green, and blue.

An overcoat 250 is formed on the color filters 230 and the light blocking member 220. Alignment layers 11 and 21 are formed on insides of the lower and upper panels 100 and 200, respectively.

On the other hand, as shown in FIG. 1, the overlapping area between the gate electrode 124 and the source electrode 173 is less than the overlapping area between the gate electrode 124 and the drain electrode 175 in the liquid crystal display according to the current exemplary embodiment, thereby preventing the delay of the data voltages.

However, if the overlapping area between the gate electrode 124 and the drain electrode 175 is increased, a kick-back voltage (ΔVk) is increased to secure sufficient width of the channel in substitution for the reduction of the overlapping area between the gate electrode 124 and the source electrode 173. Hereafter, this will be described in detail.

According to an exemplary embodiment of a driving method of the liquid crystal display of the present invention, if a gate-on voltage is applied to the gate line 121, the thin film transistor Q connected to the gate line is turned on. When the gate-on voltage is applied, the data voltage applied to the data line 171 is transmitted to the pixel electrode 191 through the turned-on thin film transistor Q, and thereby represents a pixel electrode voltage. Then, the pixel electrode voltage is dropped by the influence of the voltage change with the some drop in the instant when a gate-on voltage becomes a gate-off voltage, after a data voltage is applied, and this is the kick-back voltage (ΔVk). This kick-back voltage (ΔVk) may be represented by the following equation.

$$\Delta Vk = \frac{Cgd}{Clc + Cst + Cgd} \times \Delta Vg$$

Here, Clc is a capacitance of the liquid crystal capacitor, Cst is a capacitance of the storage capacitor, Cgd is a parasitic capacitance between the gate electrode 124 and the drain electrode 175, and ΔVg is a difference between the gate-on voltage and the gate-off voltage.

Accordingly, the kick-back voltage (ΔVk) is increased according to an increase of the parasitic capacitance Cgd generated between the gate electrode 124 and the drain electrode 175. Here, the parasitic capacitance Cgd generated between the gate electrode 124 and the drain electrode 175 is increased according to the increase of the overlapping area between the gate electrode 124 and the drain electrode 175.

However, as described, the pixel electrode 191 and the common electrode 270 are formed on the same insulating substrate 110 such that the distance therebetween is relatively short in the liquid crystal display according to the current exemplary embodiment. Accordingly, the capacitance Cst of the storage capacitor is extremely large compared with the parasitic capacitance Cgd between the gate electrode 124 and the drain electrode 175. Resultantly, the influence of the kick-back voltage (ΔVk) for the pixel electrode voltage is relatively small. Accordingly, it is more important to decrease the parasitic capacitance generated between the gate electrode 124 and the source electrode 173, thereby reducing the delay of the data voltage, than as described above. Accordingly, when the thin film transistors of the structures shown in FIG. 1 or FIG. 2 are used in the current exemplary embodiment, the effect of the present invention of reducing the delay of the data voltages may be maximized.

Now, a liquid crystal display according to another exemplary embodiment of the present invention will be described in detail with the reference to FIG. 6 through FIG. 8.

Figure 6:
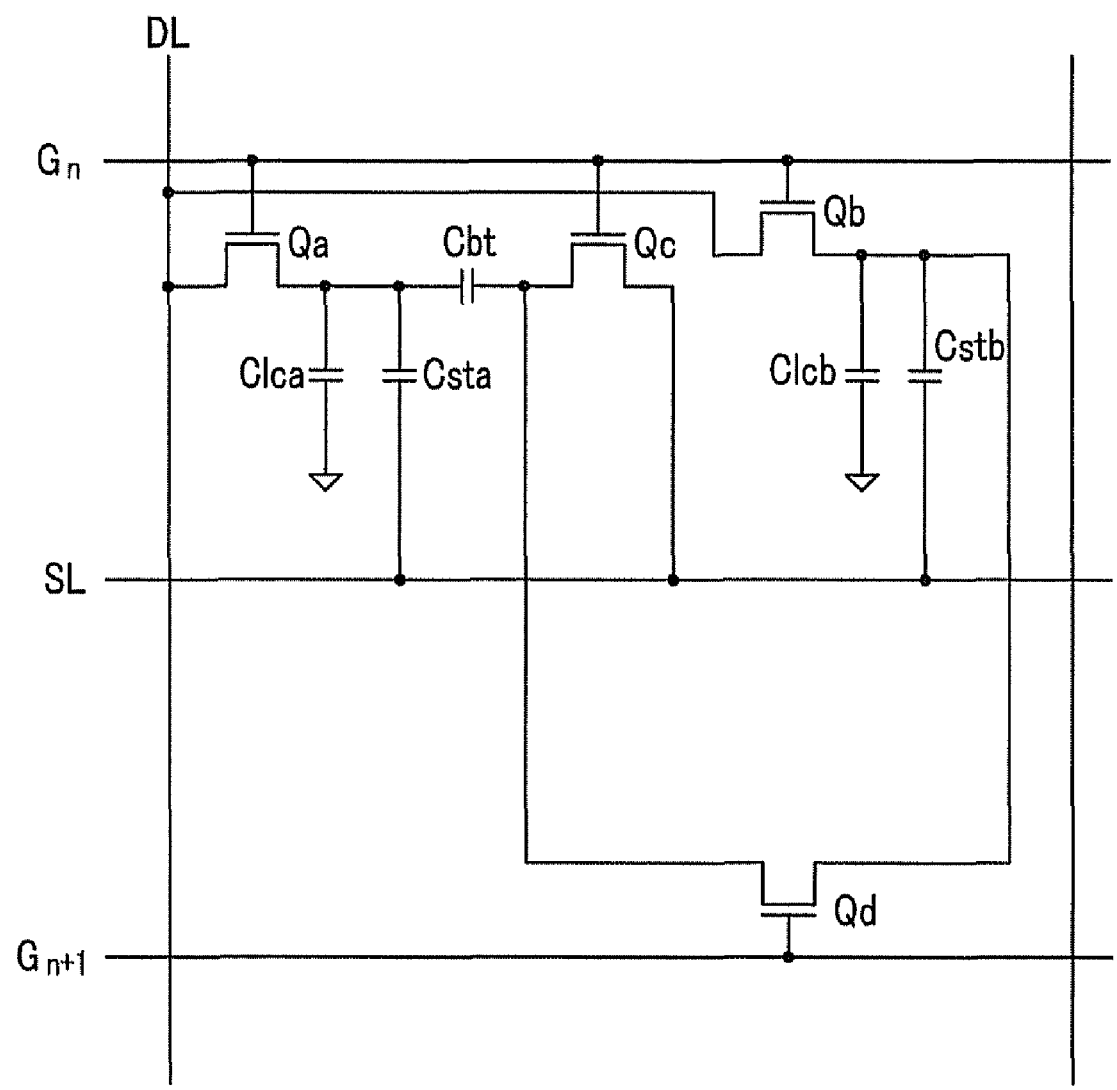
FIG. 6 is an equivalent circuit diagram of another exemplary embodiment of one pixel in a liquid crystal display according to of the present invention.

FIG. 6 is an equivalent circuit diagram of another exemplary embodiment of one pixel in a liquid crystal display according to the present invention.

Referring to FIG. 6, in a liquid crystal display according to the current exemplary embodiment of the present invention, a pixel includes a signal line including first and second gate lines $G_n$ and $G_{n+1}$ neighboring each other, and a data line DL and a storage electrode line SL.

The pixel includes first, second, third, and fourth switching elements Qa, Qb, Qc, and Qd, first and second liquid crystal capacitors Clca and Clcb, first and second storage capacitors Csta and Cstb, and an assistance capacitor Cbt.

The first and second switching elements Qa and Qb are respectively connected to the first gate line $G_n$ and the data line DL, the third switching element Qc is connected to the first gate line $G_n$ and the storage electrode line SL, and the fourth switching element Qd is connected to the second gate line $G_{n+1}$ the second switching element Qb, and the third switching element Qc.

The first switching element Qa and the second switching element Qb are each a three-terminal element of a thin film transistor, etc., which is included in the lower panel 100. The first switching element Qa and the second switching element Qb each include a control terminal connected to the first gate line $G_n$, an input terminal connected to the data line DL, and an output terminal connected to the first and second liquid crystal capacitors Clca and Clcb, respectively and the first and second storage capacitors Csta and Cstb, respectively.

The third switching element Qc is also a three-terminal element of a thin film transistor, etc., which is included in the lower panel 100. The third switching element Qc includes a control terminal connected to the first gate line $G_n$, an input terminal connected to the storage electrode line SL, and an output terminal connected to the fourth switching element Qd and the assistance capacitor Cbt.

The fourth switching element Qd is also a three-terminal element of a thin film transistor, etc., which is included in the lower panel 100. The fourth switching element Qd includes a control terminal connected to the second gate line $G_{n+1}$, an input terminal connected to the second switching element Qb, and an output terminal connected to the output terminal of the switching element Qc and the assistance capacitor Cbt.

The first storage capacitor Csta and the second storage capacitor Cstb are connected to the first switching element Qa and the second switching element Qb, respectively and the storage electrode line SL, and serve to assist the first and second liquid crystal capacitor Clca and Clcb, respectively. The first storage capacitor Csta and the second storage capacitor Cstb include the storage electrode line SL provided in the lower panel 100 and the pixel electrode 191, which are overlapped with an insulator therebetween, and the storage electrode line SL is applied with a given voltage such as the common voltage Vcom.

The assistance capacitor Cbt is connected to the output terminals of the first switching element Qa, the third switching element Qc, and fourth switching element Qd.

Now, the liquid crystal display shown in FIG. 6 will be described with reference to FIG. 7 and FIG. 8.

Figure 7:
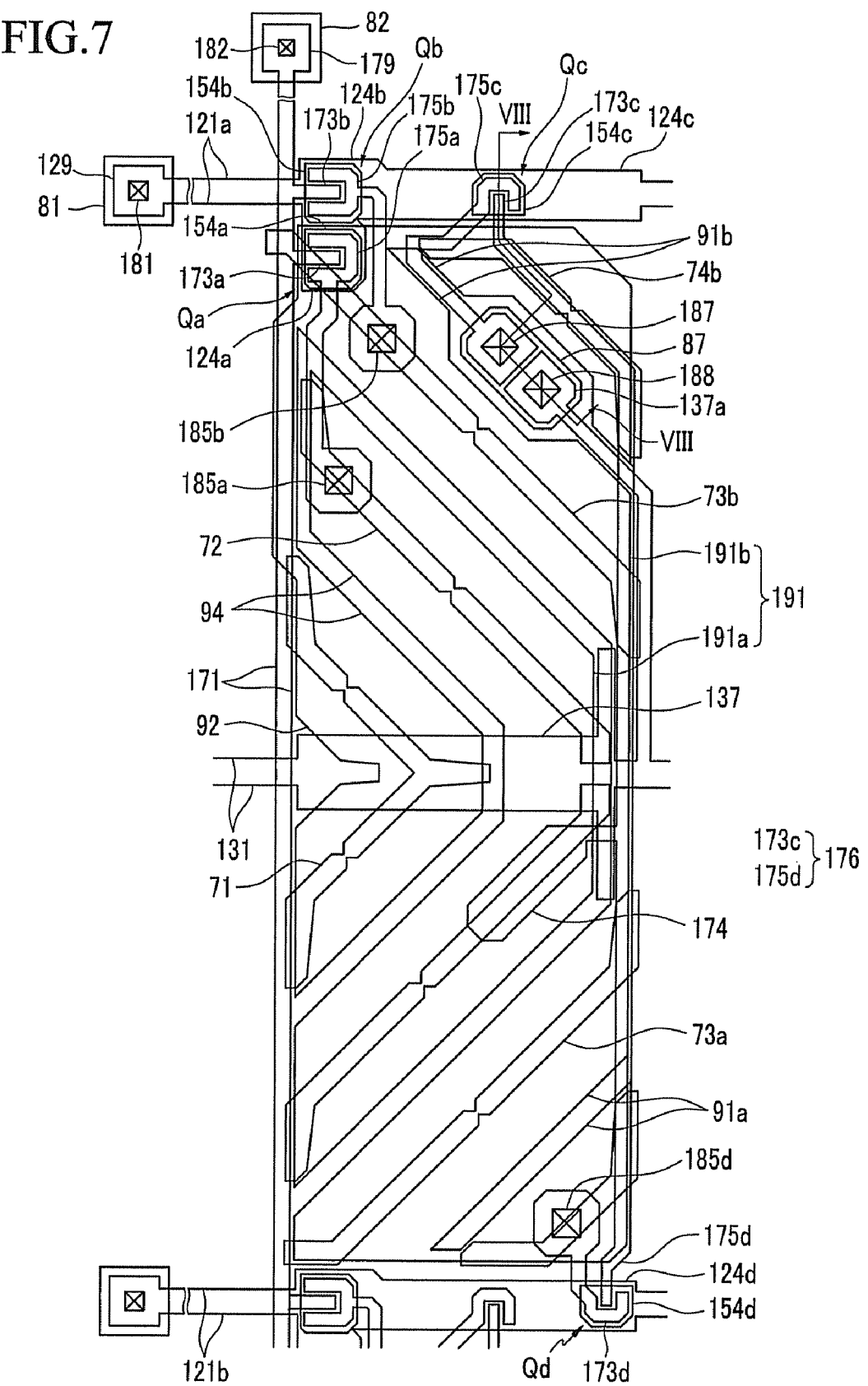
FIG. 7 is a layout view of another exemplary embodiment of a liquid crystal display according to the present invention.
Figure 8:
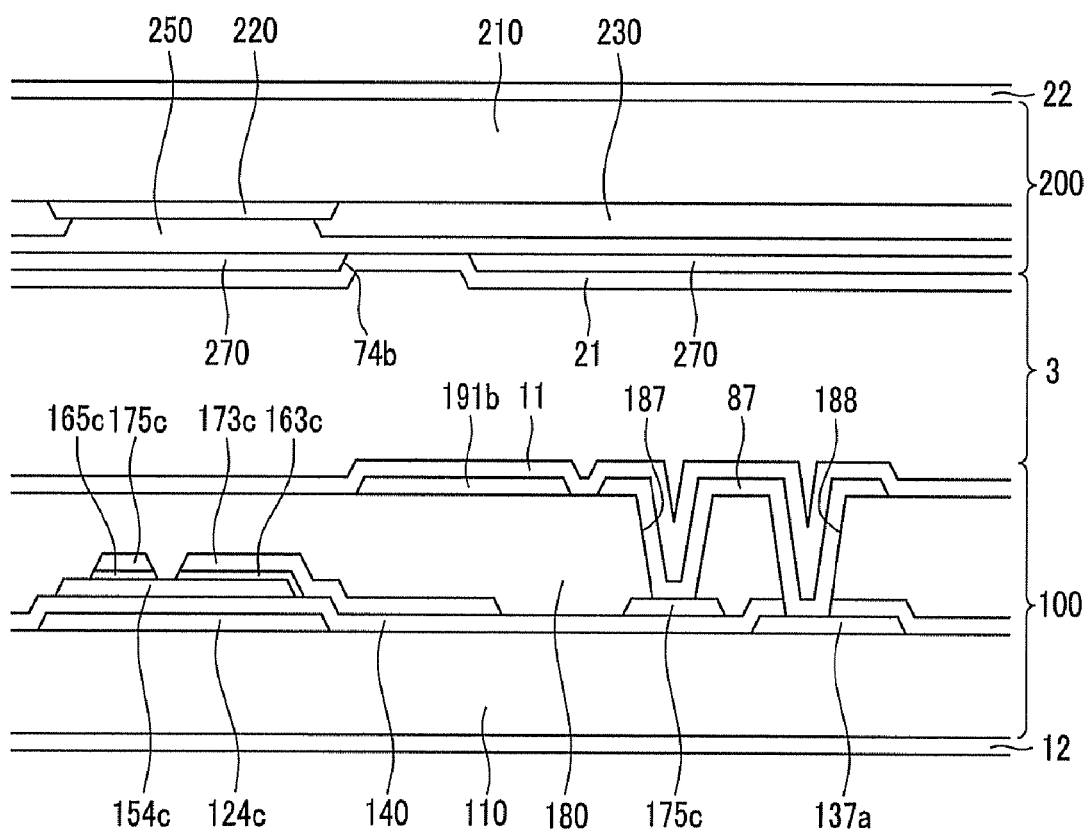
FIG. 8 is a cross-sectional view of the liquid crystal display shown in FIG. 7 taken along the line VIII-VIII.

FIG. 7 is a layout view of an exemplary embodiment of a liquid crystal display according to the present invention, and FIG. 8 is a cross-sectional view of the liquid crystal display shown in FIG. 7 taken along the line VIII-VIII.

Referring to FIG. 7, a liquid crystal display according to an exemplary embodiment of the present invention includes a lower panel 100 and an upper panel 200 facing each other, and a liquid crystal layer 3 formed between the lower and upper panels 100 and 200.

A layered structure of the liquid crystal panel assembly according to the current exemplary embodiment similar to the layered structure of the liquid crystal panel assembly shown in FIG. 3 through FIG. 5.

The lower panel 100 includes a plurality of gate conductors including a plurality of first and second gate lines 121a and 121b and a plurality of storage electrode lines 131 are formed on an insulating substrate 110 I. Each first and second gate line 121a and 121b includes gate electrodes 124a, 124b, 124c, and 124d and an end portion 129a and 129b, respectively, and each storage electrode line 131 includes a plurality of storage electrodes 137. The storage electrodes 137 form wide end portions 137a extended upward and having a wide area.

A gate insulating layer 140 is formed on the gate conductors 121a, 121b, and 131. A plurality of first and second semiconductor members 154a, 154b, 154c, and 154d are formed on the gate insulating layer 140, and a plurality of ohmic contacts 163c and 165c are formed thereon.

A plurality of data conductors including a plurality of data lines 171, a plurality of first, second, and third drain electrodes 175a, 175b, and 175c, and a plurality of first and second electrode members 176 and 173d are formed on the ohmic contacts 163c and 165c, and on the gate insulating layer 140. The data lines 171 include a plurality of first and second source electrodes 173a and 173b, and an end portion 179. One end of the first electrode member 176 forms a third source electrode 173c, the other end forms a fourth drain electrode 175d, and the second electrode member 173d forms a fourth source electrode.

A first gate electrode 124a, a second gate electrode 124b, a third gate electrode 124c and a fourth gate electrode 124d, a first source electrode 173a, a second source electrode 173b, a third source electrode 173c and a fourth source electrode 173d, and a first drain electrode 175a, a second drain electrode 175b, a third drain electrode 175c and a fourth drain electrode 175d forms a first thin film transistor (TFT) Qa, a second TFT Qb, a third TFT Qc and a fourth TFT Qd along with a first semiconductor member 154a, a second semiconductor member 154b, a third semiconductor member 154c and a fourth semiconductor member 154d, and the channels of the thin film transistors are respectively formed in the semiconductor members 154a, 154b, 154c, 154d between the first, second, third and fourth source electrodes 173a, 173b, 173c, 173d and the first, second, third and fourth drain electrodes 175a, 175b, 175c, 175d, respectively.

In the liquid crystal display of FIG. 7, similar to the liquid crystal display of FIG. 3, the overlapping area between the first and second source electrodes 173a and 173b and the first and second gate electrodes 124a and 124b, respectively are less than the overlapping area between the first and second drain electrodes 175a and 175b and the first and second gate electrodes 124a and 124b.

A passivation layer 180 is formed on the data conductors 171, 173d, 175a, 175b, 175c, and 176 and the exposed semiconductor members 154a, 154b, 154c, and 154d, and the passivation layer 180 and the gate insulating layer 140 have a plurality of contact holes 181, 182, 185a, 185b, 185d, 187, and 188.

A plurality of pixel electrodes 191 including first and second sub-pixel electrodes 191a and 191b, a plurality of contact assistants 81 and 82, and a plurality of connecting members 87 are formed on the passivation layer 180.

The connecting members 87 are electrically connected to the third drain electrodes 175c and the wide end portion 137a of the storage electrodes 137 through the contact holes 187 and 188.

On the other hand, portions of the second electrode members 176 extend to form auxiliary electrodes 174 overlapping the first sub-pixel electrodes 191a. The first sub-pixel electrodes 191a and the auxiliary electrodes 174 form the assistance capacitors Cbt via the passivation layer 180.

An alignment layer 11 is formed on the pixel electrodes 191, the contact assistants 81 and 82, and the passivation layer 180.

The upper panel 200 will now be explained. A light blocking member 220, a plurality of color filters 230, an overcoat 250, a common electrode 270, and an alignment layer 21 are formed on an insulating substrate 210.

In the current exemplary embodiment, the pixel electrode 191 of the liquid crystal display shown in FIG. 7 includes the first and second sub-pixels 191a and 191b which are separated from each other. The first and second sub-pixel electrodes 191a and 191b are respectively physically and electrically connected to the first and second drain electrode 175a and 175b through the contact holes 185a and 185b to receive data voltages from the first and second drain electrode 175a and 175b.

A pair of a first and a second sub-pixel electrode 191a and 191b forming a pixel electrode 191 engage with each other with a gap 94 disposed therebetween, and the first sub-pixel electrode 191a is interposed within the second sub-pixel electrode 191b. The gap 94 includes a vertical portion and an oblique portion.

The second sub-pixel electrode 191b includes lower and upper cutouts 91a and 91b, and a central cutout 92. The width of the central portion of the upper cutout 91b is extended and the connecting member 87 is inserted therein. The central cutout 92 extends according to the storage electrode line 131 and includes a pair of oblique portions.

The oblique portions of the gap 94 and the central cutout 92, and the lower and the upper cutouts 91a and 91b are inclined with respect to the gate line 121a and 121b by an angle of approximately 45°.

The lower portion of the pixel electrode 191 is partitioned into four regions by the lower cutout 91a, the central cutout 92, and the gap 94, and an upper portion of the pixel electrode 191 is partitioned into four regions by the upper cutout 91b, the central cutout 92, and the gap 94. According to an exemplary embodiment, the number of regions or cutouts may vary depending on design components, such as the size of the pixel electrode 191, the length ratio of the horizontal side and the vertical side of the pixel electrode 191, the type of liquid crystal layer 3, or other characteristics.

The second sub-pixel electrode 191b is partially overlapped with the data line 171, in the liquid crystal display according to the present exemplary embodiment, thereby increasing the aperture ratio.

In the current exemplary embodiment, the common electrode 270 of the liquid crystal display shown in FIG. 7 is disposed on the upper panel 200. The common electrode 270 includes a set of a plurality of cutouts 71, 72, 73a, 73b, 74a, and 74b. Each cutout 71 through 74b includes at least one oblique portion parallel to the upper or lower cutout 91b or 91a of the pixel electrode 191. The oblique portions of the cutouts 71 through 74b include notches having a triangular shape.

The liquid crystal layer 3 includes negative dielectric anisotropy, and is oriented such that the longitudinal axes of the liquid crystal molecules of the liquid crystal layer 3 are perpendicular to the surfaces of the lower and upper panels 100 and 200 when no electric field is applied.

Now, the operation of the liquid crystal display according to an exemplary embodiment of the present invention will be described in detail with reference to FIG. 6 and FIG. 7.

Referring to FIG. 6 and FIG. 7, if the gate-on voltage is applied to the first gate line 121a, the first to third thin film transistors Qa, Qb, and Qc connected thereto are turned on. Accordingly, the data voltages applied to the data line 171 are transmitted to the first and second sub-pixel electrodes 191a and 191b through the first and second thin film transistors Qa and Qb that are turned on. In the current exemplary embodiment, the data voltages applied to the first and second sub-pixel electrodes 191a and 191b are the same. The first and second liquid crystal capacitors Clca and Clcb are charged with a voltage corresponding to a difference between the common voltage and the first and the second sub-pixel electrode voltage. On the other hand, if the third thin film transistor Qc is turned on, the common voltage Vcom applied to the storage electrode line SL is transmitted to the auxiliary electrode 174, and the assistant capacitor Cbt is charged with the voltage corresponding to the difference between the first sub-pixel electrode voltage and the common voltage Vcom.

Then, when the second gate line 121b is applied with the gate-on voltage, the fourth thin film transistor Qd is turned on. Thus, the voltage of the second sub-pixel electrode 191b is applied to the auxiliary electrode 174 through the turned-on fourth thin film transistor Qd. Thus, the difference between the voltage of the first sub-pixel electrode 191a which forms the assistant capacitor Cbt along with the auxiliary electrode 174, and the common voltage, is increased. Accordingly, the difference between the common voltage Vcom and the voltage of the second sub-pixel electrode 191b after turning on the fourth thin film transistor Qd is less than the difference between the common voltage Vcom and the voltage of the second sub-pixel electrode 191b before turning on the fourth thin film transistor Qd, and the difference between the common voltage Vcom and the voltage of the first sub-pixel electrode 191a after turning on the fourth thin film transistor Qd is more than the difference between the common voltage Vcom and the voltage of the first sub-pixel electrode 191 a before turning on the fourth thin film transistor Qd. That is, the charging voltage of the second liquid crystal capacitor Clcb becomes less than the charging voltage Clca of the first liquid crystal capacitor after turning on the fourth thin film transistor Qd.

In the current exemplary embodiment, the charging voltages of the two liquid crystal capacitors Clca and Clca have different gamma curves, and the gamma curve of the voltage of one pixel becomes a curved line when the gamma curves are combined. Thus, making a combined gamma curve in the front side be accorded with the reference gamma curve in the front side that is the most suitable for the liquid crystal panel assembly, and to make a combined gamma curve in the lateral side be closer to the reference gamma curve in the front side.

Accordingly, the image data is converted, to thereby improve the side visibility.

On the other hand, when the liquid crystal capacitors Clca and Clcb are charged, an electric field that is almost perpendicular to the surfaces of the display panels 100 and 200 is generated. The liquid crystal molecules change direction so that the long axes thereof are perpendicular to a direction of the electric field in response to the electric field.

On the other hand, the cutouts 91 a through 92 and 71 through 74b of the field generating electrodes 191 and 270, the gap 94, and the oblique edges of the pixel electrode 191 parallel thereto distort the electric field, and form a horizontal element that determines an inclined direction of the liquid crystal molecules. The horizontal element of the electric field is perpendicular to the oblique sides of the cutouts 91a through 92 and 71 through 74b and the oblique side of the pixel electrode 191.

One set of the common electrode cutouts 71 through 74b, and a set of pixel electrode cutouts 91a through 92 and the gap 94 divide each pixel electrode 191 into sub-regions. Each sub-region has two major edges forming an oblique angle with respect to the major edges of the pixel electrode 191. The liquid crystal molecules disposed on each sub-region are perpendicularly inclined with respect to the major edges, and thus there are four inclined directions. Therefore, the viewing angle of the liquid crystal display is widened by varying the inclined directions of the liquid crystal molecules.

In the current exemplary embodiment, the first and second thin film transistors Qa and Qb are connected to a same gate line 121a and a same data line 171. That is, one data line 171 is connected to two source electrodes 173a and 173b. Since the parasitic capacitances generated between the respective source electrodes 173a and 173b and the respective gate electrodes 124a and 124b are more influenced compared with the case in which one data line 171 is connected to one source electrode 173, the delay of the data voltage may be easily generated.

However, according to the current exemplary embodiment, the overlapping area between the respective source electrodes 173a and 173b and the corresponding gate electrodes 124a and 124b are minimized such that the parasitic capacitances generated therebetween are reduced, thereby reducing the delay of the data voltage in the case in which one data line 171 is connected to two source electrodes 173a and 173b.

While the present invention has been shown and described with reference to some exemplary embodiments thereof, it should be understood by those of ordinary skill in the art that various changes in form and details may be made therein without departing from the spirit and scope of the present invention as defined by the appending claims.

What is claimed is:

1. A display device comprising:
a substrate;
a gate line formed on the substrate;
a data line which intersects the gate line; and
a thin film transistor having a gate electrode connected to the gate line, a source electrode which overlaps the gate electrode and is connected to the data line, and a drain electrode which overlaps the gate electrode,
wherein an overlapping area between the gate electrode and the drain electrode is larger than an overlapping area between the gate electrode and the source electrode.

2. The display device of claim 1, wherein
the source electrode extends in a first direction and includes a bar shape.

3. The display device of claim 2, wherein
the drain electrode encloses the source electrode.

4. The display device of claim 3, wherein
the drain electrode comprises a first portion which overlaps the gate electrode and extends in the first direction, and a second portion which overlaps the gate electrode, connected to the first portion, and extends in a second direction perpendicular to the first direction.

5. The display device of claim 4, wherein
the drain electrode further comprises a third portion which overlaps the gate electrode, connected to the first portion, and parallel to the second portion.

6. The display device of claim 5, wherein
the drain electrode comprises a portion which is curved toward the source electrode and includes a "U" shape.

7. The display device of claim 1, wherein
the overlapping area between the gate electrode and the drain electrode is approximately three times the overlapping area between the gate electrode and the source electrode.

8. The display device of claim 1, further comprising:
a pixel electrode connected to the drain electrode;
a common electrode facing the pixel electrode; and
a liquid crystal layer faced with the common electrode, the pixel electrode is disposed between the liquid crystal layer and the common electrode.

9. The display device of claim 8, wherein
the pixel electrode comprises a plurality of cutouts which forms an oblique angle with the gate line.

10. The display device of claim 9, wherein
the cutouts are symmetrical with a straight line bisecting the pixel electrode and parallel to the gate line.

11. The display device of claim 1, wherein
the thin film transistor comprises a first thin film transistor and a second thin film transistor,
and comprises a first sub-pixel electrode connected to the drain electrode of the first thin film transistor and a second sub-pixel electrode connected to the drain electrode of the second thin film transistor.

12. The display device of claim 11, wherein
the source electrodes of the first and second thin film transistors are connected to a same data line.

13. The display device of claim 12, wherein
a voltage of the first sub-pixel electrode is higher than a voltage of the second sub-pixel electrode with reference to a predetermined voltage.

14. The display device of claim 1, wherein parasitic capacitance between the gate electrode and the drain electrode is greater than parasitic capacitance between the gate electrode and the source electrode.

15. A display device comprising:
a substrate;
a gate line formed on the substrate;
a data line which intersects the gate line; and
a thin film transistor including a gate electrode, a source electrode, and a drain electrode,
wherein the gate electrode is connected to the gate line,
the source electrode is connected to the data line, and comprises a first edge and a second edge which overlaps the gate electrode and is parallel to each other and a third edge connecting the first and second edges to each other, and
the drain electrode comprises
a facing portion which overlaps the gate electrode at least facing to the first and the third edges of the source electrode, and
a connecting portion which is connected to the facing portion.

16. The display device of claim 15, wherein the drain electrode faces
the second edge of the source electrode.

17. The display device of claim 16, wherein
the facing portion is curved toward the source electrode and includes a "U" shape.

18. The display device of claim 8, wherein
the cutouts comprise a first cutout having a bar shape;
a second cutout having a bar shape, and forming an acute angle with respect to the first pixel electrode; and
a center pixel electrode having a triangle shape, and formed between the first pixel electrode and the second pixel electrode.

* * * * *